Patented Sept. 8, 1936

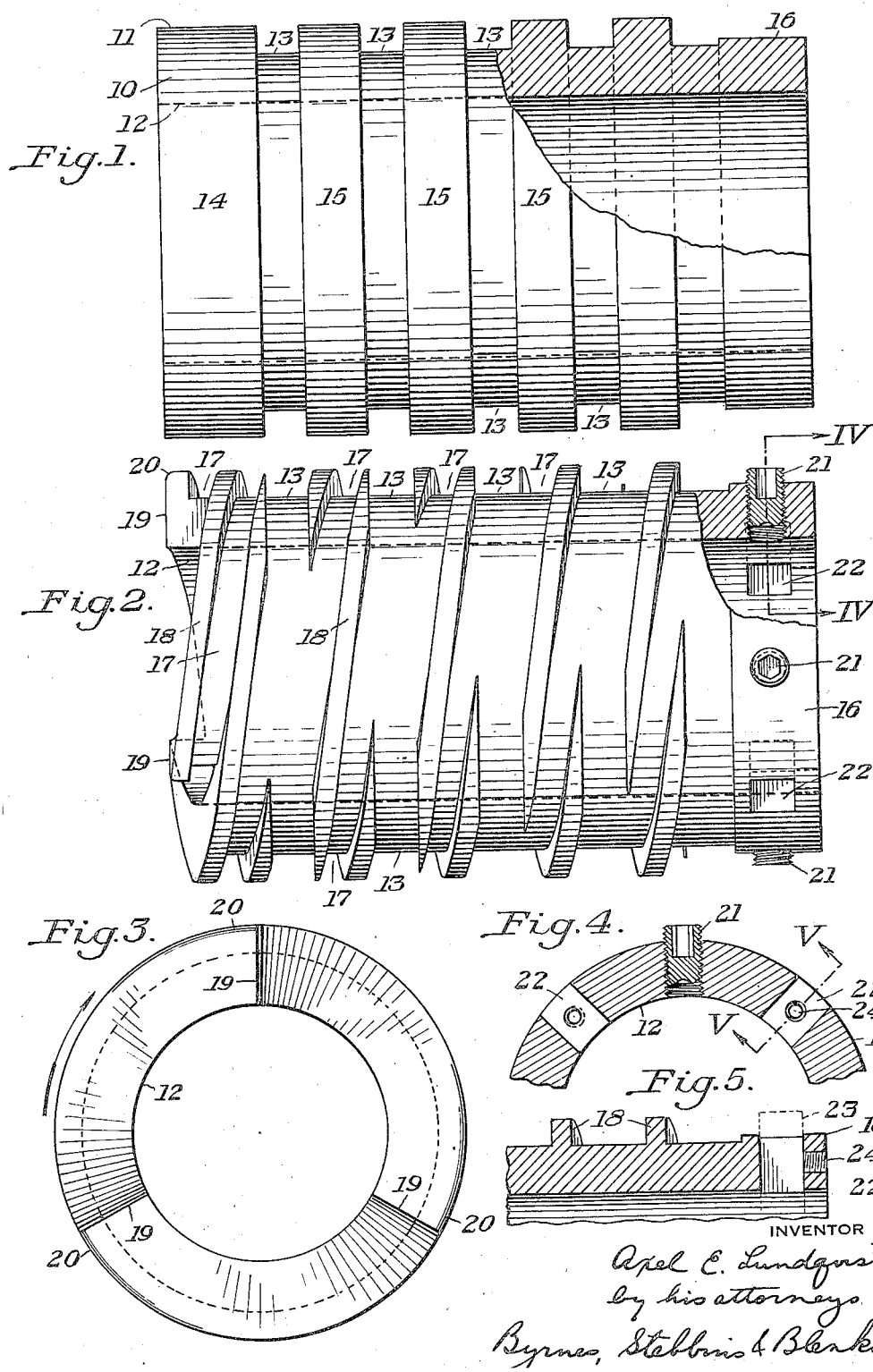

2,053,486

UNITED STATES PATENT OFFICE 2,053,486

BORING TOOL

Axel E. Lundqvist, Youngstown, Pa.

Application March 19, 1935, Serial No. 11,822

4 Claims. (Cl. 77—58)

My invention relates to a boring tool and the method by which it is made.

Cored holes of relatively large diameter in castings have heretofore been finished by means of a cutting tool mounted on a boring bar extending into the hole. The casting is generally rotated and the tool advanced into engagement with the casting inside the cored hole to take the necessary finishing cut or cuts therefrom. This practice is objectionable because of the large amount of time required and also for the reason that extreme accuracy in the finished diameter of the bore cannot be obtained. The boring bar or mandrel suffers a certain amount of deflection which results in the boring of a tapered hole instead of a true cylindrical hole. This result is a decided disadvantage, particularly in boring round holes in molds for ingots, because of the difficulty of withdrawing the ingots cast in such molds. Inaccuracies in the shape of the cored hole, furthermore, are likely to be reproduced in the finished bore.

I have invented a boring tool and method for manufacturing it which overcomes the aforementioned objections to the practice described. In accordance with my invention, I provide cutting edges at one end of a cylinder of tool steel, and form guides or lands along the cylinder with spaces therebetween for the discharge of the chips and turnings removed in the boring operation. The tool is adapted to be mounted on a mandrel or boring bar and is capable of performing boring operations in much less time than the above described arrangement of a conventional cutting tool on a mandrel or boring bar. The method by which I manufacture the tool is to form a plurality of annular grooves along the length of the steel cylinder, leaving annular ribs or discs therebetween. I then form a plurality of multiple-lead, helical grooves intersecting the discs or ribs and of the same depth as the annular grooves. The helical grooves intersect the discs or ribs and the result is the formation of a plurality of helical, spaced, discontinuous ribs or lands which are effective to guide the tool through the work, with helical grooves and spaces therebetween which facilitate the passage of the chips and turnings toward the rear of the tool.

The structure of the tool may best be understood by a consideration of the method by which it is manufactured and, for that reason, the method of making the tool will be described first. The accompanying drawing illustrates a present preferred practice of the method and embodiment of the structure, although it will be understood that changes in the method and structure may be made within the scope of my broader claims. In the drawing:

Figure 1 is a side elevation partly broken away of a steel cylinder after the preliminary operations have been performed thereon;

Figure 2 is a similar view showing the finished tool;

Figure 3 is an end view of the tool as shown in Figure 2;

Figure 4 is a partial sectional view along the line IV—IV of Figure 2; and

Figure 5 is a partial sectional view along the line V—V of Figure 4.

In the manufacture of the tool of my invention, I utilize a steel cylinder which may be of tool steel in whole or in part. In any event, the portion of the tool on which the cutting edges are to be formed, as will be described later, should be of tool steel. The remainder of the tool may be of ordinary low carbon steel. The first operation on the tool is the formation of an axial bore therethrough of such diameter as to leave sufficient material in the wall of the cylinder to provide adequate strength and rigidity. I then mount the steel cylinder in a turning lathe or other suitable machine and turn the cylinder to substantially the desired finished diameter of the bore to be formed by the tool. The turning operation, of course, is performed so that the outer wall of the cylinder is coaxial with the bore therethrough.

I then turn, mill or otherwise form a plurality of annular grooves in spaced relation along the length of the cylinder. The result of this operation is shown in Figure 1 in which the tool is indicated generally at 10, the outer cylindrical surface thereof at 11, the axial bore therethrough at 12, and the spaced annular grooves at 13. The forming of the grooves 13 leaves a head 14 at one end of the cylinder and a plurality of spaced annular ribs or discs 15 between the grooves 13. The other end of the cylinder is turned down to form a shank 16.

I next form a plurality of helical, multiple-lead grooves starting at the head 14 and intersecting the ribs or discs 15, the helical grooves being of substantially the same depth as the annular grooves 13, as shown in Figure 2. The spiral grooves are indicated at 17. Because of the fact that the helical grooves are turned only to the depth of the grooves 13, they are discontinuous, being formed only of the material in the head 14 and ribs 15 which is disposed outwardly of the bottom of the grooves 13. As shown in Figure 2, moreover, the helical ribs or lands 18 formed by the cutting of the helical grooves, are discontinuous and feather off into sharp edges at both ends. The ends of adjacent helical ribs overlap. The grooves 13 are still apparent after the cutting of the grooves 17 and form clear annular spaces between groups of partial helical ribs formed by each of the annular ribs 15. The pitch of the grooves 17 may be either right or left depending on whether a right-hand or left-hand cutter is desired.

The head end of the tool is milled back along (in the example illustrated, three) helical ribs 18 to form cutting edges 19, the outer ends of the cutting edges being rounded slightly as at 20. The head end of the tool may be subjected to a suitable heat treatment to harden the cutting edges.

The shank 16 is drilled and tapped and provided with socket screws 21 for engaging a mandrel or boring bar passed through the bore 12. The shank is also provided with square radial holes 22 forming sockets adapted to receive cutting tools 23 for taking a slight finishing cut from the bore in addition to that taken by the edges 19. Axial tapped holes 24 are provided at the shank end of the tools for set screws adapted to engage the tools 23. The ribs 18 are relieved slightly from a point adjacent the edges 19 to provide sufficient clearance for the body of the tool to pass through the bore formed by the edges on the head.

As already intimated, the tool as shown in Figure 2 is clamped upon a mandrel or boring bar adapted to be fed into or through a cored hole in the casting which it is desired to finish, the tool preferably being held against rotation and the work revolved about it. The boring bar or mandrel, of course, is preferably arranged to feed the tool to the work at the desired rate. As the edges 19 engage the wall of the cored hole, a finishing cut is taken therefrom. The chips and turnings removed from the work are fed through the grooves 17 to the grooves 13 and so on until discharged from the shank end of the tool. The sharp edges at the ends of the ribs 18 are very effective to transfer chips and turnings from one groove 13 to the next, through the connecting spiral grooves 17. Jamming or binding of the tool by reason of accumulation of chips and turnings between it and the work are thus avoided. The ribs 18 distributed along the length of the body of the tool constitute guides engaging the bore formed by the edges 19, which insure that the tool travels through the work in a perfectly straight line regardless even of any deviations of the cored hole from the true axis. The length of the tool is such that once it has been started on the proper axis, it is impossible for it to be deflected from the true path. The edges 19, of course, form a perfectly cylindrical bore of constant diameter from end to end. The edges may be reground as necessary, but such regrinding will be necessary only infrequently. If desired, the cutting edges may be formed on separate, detachable members secured to the head of the tool.

The tool has been found to be highly effective in operation and is capable of finishing a bore at a rate of speed much higher than it has been possible to obtain with the previous shop practice described above. On one particular job, viz., the boring of a cast iron mold for brass ingots, open at both ends, the time allowance using a through boring bar and a conventional cutter, was 28 hours. The tool of my invention successfully completed the same work within the space of 75 minutes without injury to the tool. The finished job, furthermore, was more accurate when performed with the tool of my invention, particularly as to the constant diameter of the bore. There was no sign of the hour-glass shape characteristic of the old arrangement because of the deflection of the boring bar adjacent the middle of the bore. The tool can be produced at relatively low cost and has a long, useful life. As already stated, the body of the tool may be made of low carbon steel and only the head portion 14 thereof formed of tool steel. This requires only that a disc of tool steel of appropriate thickness be welded to the cylinder of low carbon steel intended to form the body of the tool.

Although I have illustrated and described herein but one preferred practice of the method of my invention and a single embodiment of the result thereof, it will be obvious that the practice and structure described may be altered without departing from the spirit of my invention or the scope of the appended claims.

I claim:

1. A boring tool comprising a generally cylindrical body, recesses cut into one end of the body forming substantially radial cutting edges, and a plurality of helical, discontinuous lands extending circumferentially of the body, and spaced longitudinally thereof, said lands having relatively wide bearing surfaces lying in a cylindrical surface for guiding the tool through a bore, said lands being provided with relatively sharp leading edges for penetrating masses of chips and moving them rearwardly.

2. A boring tool made by cutting spaced annular grooves in a substantially cylindrical body, cutting a helical groove therein intersecting said annular grooves and of substantially the same depth, and providing a recess forming a radial cutting edge where the helical groove runs off the body, the finished tool being characterized by a plurality of helical, discontinuous lands spaced therealong having sharp leading edges adapted to penetrate masses of chips and move them rearwardly, and relatively broad bearing surfaces effective to guide the tool axially through a bore.

3. A boring tool comprising a substantially cylindrical body, recesses formed on one end thereof providing radial cutting edges, and a plurality of discontinuous, helical ribs or lands extending partly around and spaced longitudinally of the body, said lands having relatively broad bearing surfaces effective to guide the tool through a bore, and feathered leading ends to feed chips and cuttings backwardly.

4. A tool as defined by claim 3 characterized by a radial hole in said body adapted to receive the shank of a cutting tool.

AXEL E. LUNDQVIST.